US009819506B2

(12) United States Patent
Previti

(10) Patent No.: US 9,819,506 B2
(45) Date of Patent: Nov. 14, 2017

(54) METHOD FOR TRANSMISSION AND RECEPTION IN POINT-MULTIPOINT RADIO BROADCASTING OF MULTILANGUAGE MESSAGES IN CELLULAR MOBILE COMMUNICATIONS, MOBILE TELECOMMUNICATIONS NETWORK AND MOBILE TERMINAL FOR THE EMBODIMENT OF THE METHOD

(71) Applicant: SISVEL TECHNOLOGY S.R.L., None (TO) (IT)

(72) Inventor: Gianluca Previti, Turin (IT)

(73) Assignee: Sisvel Technology S.R.L., None (TO) (IT)

( * ) Notice: Subject to any disclaimer, the term of this patent is extended or adjusted under 35 U.S.C. 154(b) by 0 days.

(21) Appl. No.: 14/344,249

(22) PCT Filed: Sep. 28, 2012

(86) PCT No.: PCT/IB2012/055207
§ 371 (c)(1),
(2) Date: Mar. 11, 2014

(87) PCT Pub. No.: WO2013/046177
PCT Pub. Date: Apr. 4, 2013

(65) Prior Publication Data
US 2014/0348067 A1 Nov. 27, 2014

(30) Foreign Application Priority Data
Sep. 29, 2011 (IT) .............................. TO2011A0867

(51) Int. Cl.
*H04L 12/18* (2006.01)

(52) U.S. Cl.
CPC ........ *H04L 12/1895* (2013.01); *H04L 12/189* (2013.01); *H04L 12/1845* (2013.01)

(58) Field of Classification Search
CPC . H04L 12/1895; H04L 12/1845; H04L 12/18; H04L 12/189
See application file for complete search history.

(56) References Cited

U.S. PATENT DOCUMENTS

2003/0014258 A1* 1/2003 Fukuyama .......... H04M 3/4872
704/270.1
2003/0229674 A1 12/2003 Cabrera et al.
(Continued)

OTHER PUBLICATIONS

International Preliminary Report on Patentability dated Apr. 1, 2014, issued in PCT Application No. PCT/IB2012/055207, filed Sep. 28, 2012.

(Continued)

*Primary Examiner* — Chi H Pham
*Assistant Examiner* — Weibin Huang
(74) *Attorney, Agent, or Firm* — Workman Nydegger

(57) ABSTRACT

A method for broadcasting messages in a cellular mobile communications system with broadcast functionality includes the steps of: selecting a geographic area over which the message broadcasting must be carried out; obtaining information adapted to identify the languages used in mobile terminals referring to the cellular mobile communications system within the geographic area; composing the messages in the set of the identified languages, thus obtaining one or more multilanguage messages; broadcasting the one or more multilanguage messages to said mobile terminals.

10 Claims, 7 Drawing Sheets

(56) References Cited

U.S. PATENT DOCUMENTS

| | | | |
|---|---|---|---|
| 2004/0192258 A1* | 9/2004 | Atkin | H04L 12/1845 |
| | | | 455/412.1 |
| 2007/0123220 A1 | 5/2007 | Weiser et al. | |
| 2010/0075658 A1* | 3/2010 | Hou | H04W 48/02 |
| | | | 455/422.1 |
| 2011/0009102 A1* | 1/2011 | Almodovar Herraiz | H04L 12/1845 |
| | | | 455/414.2 |
| 2012/0282875 A1* | 11/2012 | Park | H04W 4/22 |
| | | | 455/404.1 |

OTHER PUBLICATIONS

International Search Report dated Mar. 21, 2013, filed in PCT Application No. PCT/IB2012/055207, filed Sep. 28, 2012.
TSG GERAN, LS on ETWS information in TS 23.041, 3GPP TSG-RAN WG2#65bis, R2-091992, Mar. 23, 2009, 9 pages.

* cited by examiner

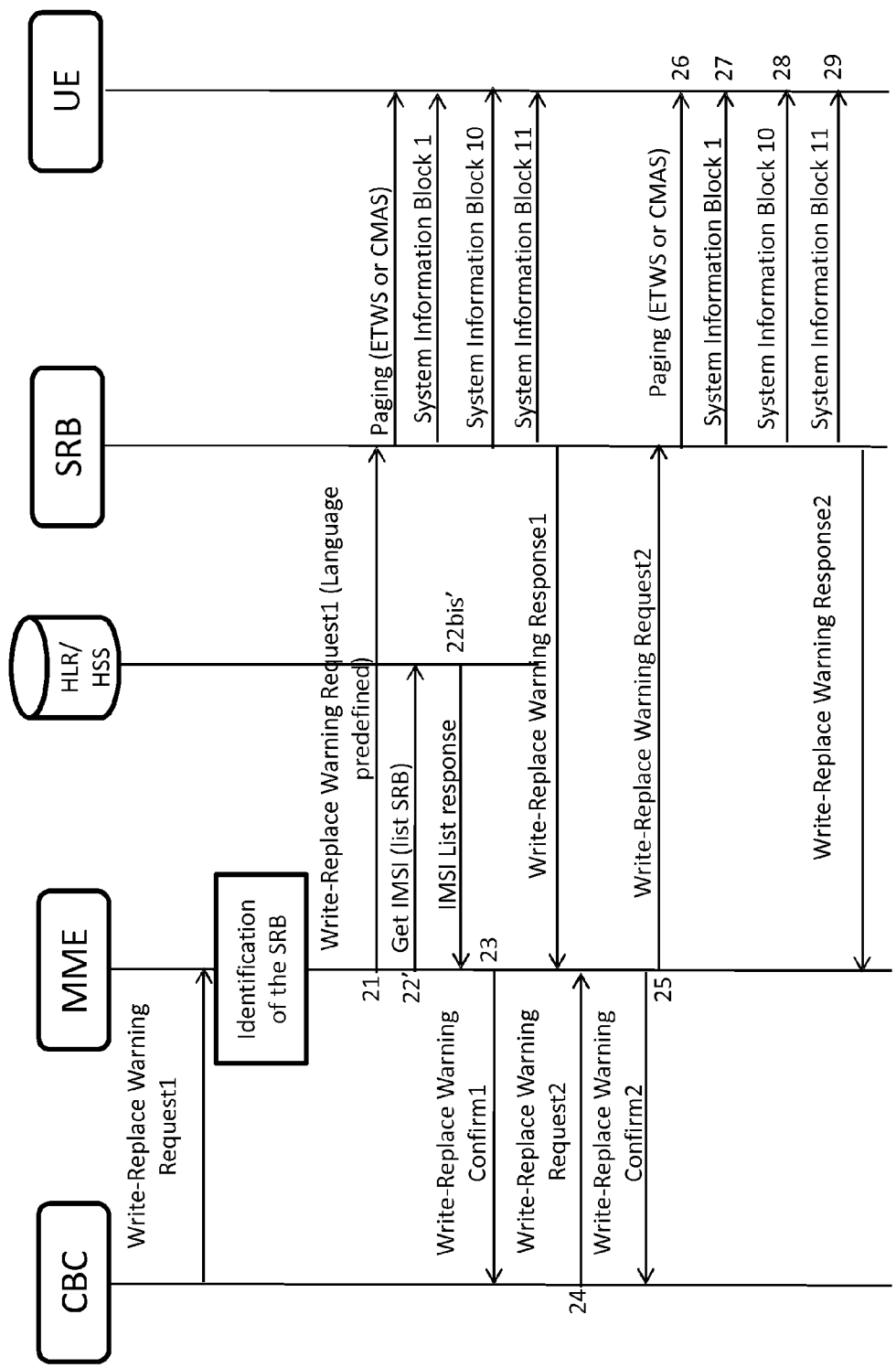
FIG 2bis

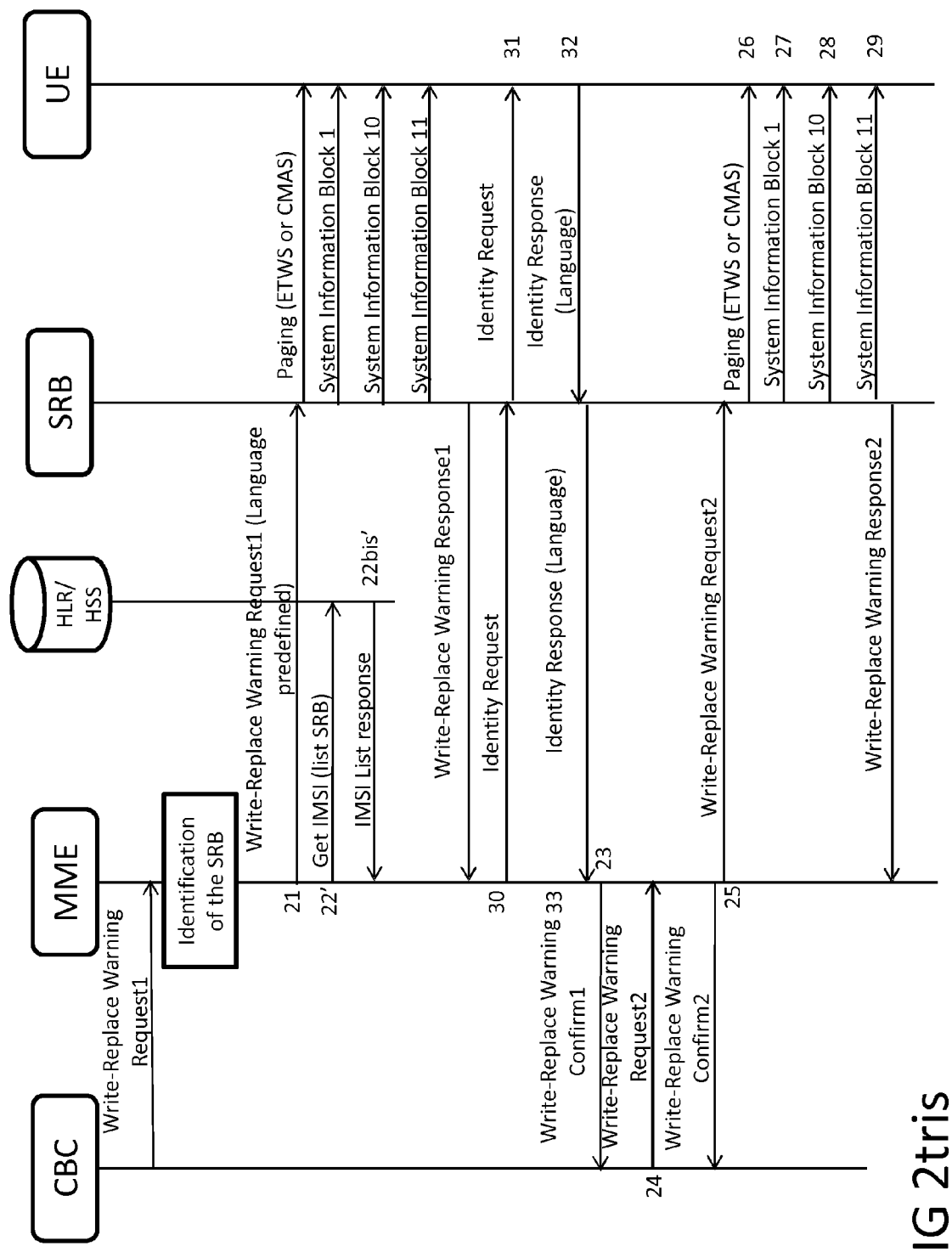
FIG 2tris

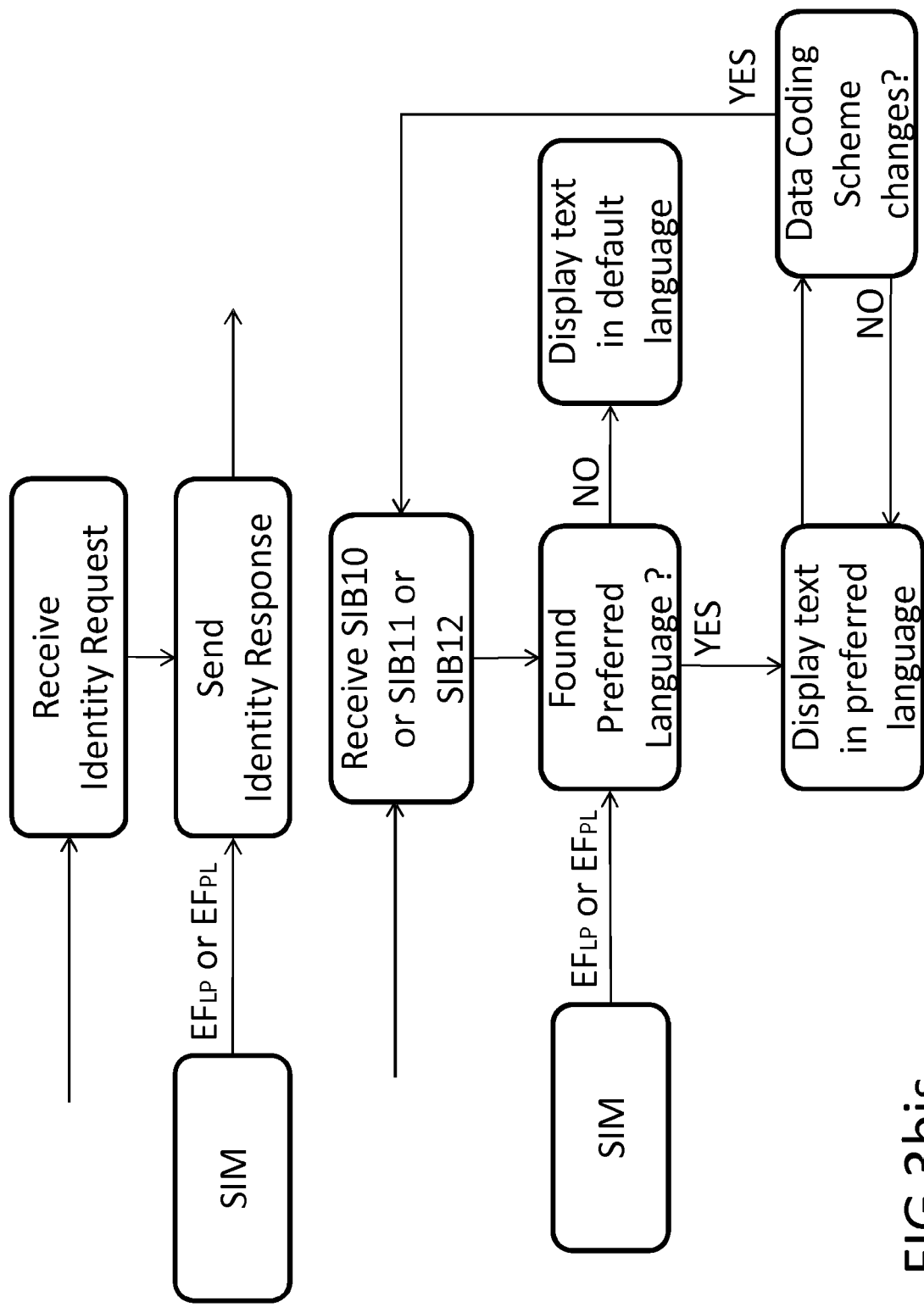
FIG 3bis

| |
|---|
| Message Type |
| Message Identifier |
| Serial Number |
| Warning Area List |
| Repetition Period |
| Extended Repetition Period |
| Number of Broadcasts Requested |
| Warning Type |
| Warning Security Information |
| Warning Message Start1 |
| Data Coding Scheme1+ |
| Warning Message Contents1 |
| Warning Message Start2 |
| Data Coding Scheme2+ |
| Warning Message Contents2 |
| ...... |
| Concurrent Warning Message Indicator |

FIG 4bis

| |
|---|
| Message Type |
| Message Identifier |
| Serial Number |
| Warning Area List |
| Repetition Period |
| Extended Repetition Period |
| Number of Broadcasts Requested |
| Warning Type |
| Warning Security Information |
| Warning Message Start1 |
| Data Coding Scheme1 |
| Warning Message Contents1 |
| Warning Message Start2 |
| Data Coding Scheme2 |
| Warning Message Contents2 |
| ...... |
| Concurrent Warning Message Indicator |

FIG 4

METHOD FOR TRANSMISSION AND RECEPTION IN POINT-MULTIPOINT RADIO BROADCASTING OF MULTILANGUAGE MESSAGES IN CELLULAR MOBILE COMMUNICATIONS, MOBILE TELECOMMUNICATIONS NETWORK AND MOBILE TERMINAL FOR THE EMBODIMENT OF THE METHOD

FIELD OF THE INVENTION

The present invention relates to a method for point-to-multipoint radio broadcast transmission and reception of multilanguage messages in cellular mobile communications, as well as to a mobile telecommunications network and a mobile terminal adapted to implement the method.

BACKGROUND ART

The rapid technologic evolution taking place in the field of cellular radio mobile communications has led to the introduction of new functions in networks as well as in mobile user apparatuses.

For example, such new functions include point-to-multipoint radio broadcast transmission, hereafter referred to as broadcasting, of messages to all the terminals belonging to selected geographic areas, e.g. according to the criterion of selecting the cells of the radio mobile system where transmission must be carried out.

This type of messaging is currently widely used, for example, in the fields of accident prevention and disaster alerting (e.g. for earthquakes, tsunamis, hurricanes, etc). It is therefore clear that the transmission network must be so structured as to ensure that messages of this type will reach as soon as possible all the users, or at least most of them, who are connected to the network in the geographic area selected for message transmission; also, messages must be quickly and correctly assimilated and understood by the users. It is also clear that mobile terminals must have such technical characteristics that allow them to properly receive and use said messages.

By way of example, we can mention the technologic evolution of cellular radio mobile communications brought about by the international standard universally known as 3GPP (3rd Generation Partnership Project: http://www.3gpp.org).

The 3 GPP standard has introduced a messaging service for distributing alert messages to mobile terminals compatible with the LTE (Long Term Evolution), UMTS (Universal Mobile Telecommunications System), GPRS (General Packet Radio Service) or GSM (Global System for Mobile Communications) standards.

These alert messages have such characteristics that allow them to contain information about imminent disasters, such as earthquakes, tsunamis and tornadoes, but they may also contain generic messages of various kinds, such as, for example, commercial messages or generic information of public interest.

As known, the above-mentioned transmission systems can utilize a channel called BCH (Broadcast Channel) for broadcasting messages that can be simultaneously received by all mobile terminals having appropriate technical characteristics and referring to those radio base stations from which said messages are being sent, which terminals are already available on the market.

Messages of this kind are handled by services implemented through known systems called ETWS (Earthquake Tsunami Warning System) and CMAS (Commercial Mobile Alert System), which utilize the BCH channel to send alert messages or commercial messages, while at the same time allowing messages to be broadcast in certain areas only by means of those radio base stations which provide coverage of the corresponding geographic areas.

Said messages are transmitted in one language only (which is not defined by the standard), which may be, for example, the official language of the country of the telephone company transmitting the messages and implementing the ETWS/CMAS system.

The transmission of messages in one language only, e.g. the local language, implies however the risk that some users, connected to the transmitting radio base stations, might not understand the message contents, e.g. because they are of a different nationality or they are not familiar with the language in use. There is therefore a risk that the messages might not be quickly and correctly assimilated and understood by the users, so that safety and protection of these people cannot be ensured.

It then becomes clear that there is a need for introducing new functionalities at network level and at mobile terminal level in order to give the possibility of quickly and correctly understanding said messages to all users referring to the radio base stations that are transmitting them.

SUMMARY OF THE INVENTION

The object of the present invention is to provide a method for point-to-multipoint radio broadcast transmission and reception of multilanguage messages in cellular mobile communications, as well as a mobile telecommunications network and a mobile terminal adapted to solve the above-described problem.

It is known that, in a mobile telephone system, the telephone company has information, at any instant, about the users subscribed to its network (IMEI, geographic area where the user is reachable, IMSI, etc.). Those companies that provide a roaming service can also have this information about subscribers of other companies who are temporarily connected to their networks (roaming).

Such information may be stored, for example, in a database (e.g. the known Home Location Register (HLR) or the Home Subscriber Server (HSS) or the like) at network service centre level, and is mainly used for managing and forwarding voice calls, messages (SMS, MMS), etc. to the users themselves.

In accordance with the present invention, when a message, e.g. one of the aforementioned ETWS/CMAS messages, is to be broadcast to users within a particular geographic area, the telephone company can extract from the database information about the nationality or the preferred language of each user who is located, at that instant, in that particular geographic area.

According to a variant of the invention, the telephone company interrogates the mobile terminal in order to obtain information about the preferred language, which may be the one set by the user in the mobile terminal itself.

By knowing this information, the company can send the message in those languages which are actually understood by the users that must be alerted.

In this manner, the mobile terminals of the users who must be reached by the message may receive the same message several times in different languages, preferably only in those languages previously selected according to the nationality or preferred language criterion.

In a possible variant, each mobile telephone chooses a preferred language and displays the message in that language only.

It is therefore one object of the present invention to provide a method for broadcasting messages in a cellular mobile communications system with broadcast functionality, comprising the steps of: selecting a geographic area over which said message broadcasting must be carried out; obtaining information adapted to identify the languages used in mobile terminals referring to the cellular mobile communications system within said geographic area; composing said messages in the set of said identified languages, thus obtaining one or more multilanguage messages; broadcasting said one or more multilanguage messages to said mobile terminals.

A particular object of the present invention is to provide a method for point-to-multipoint radio broadcast transmission and reception of multilanguage messages in cellular mobile communications, as well as a mobile telecommunications network and a mobile terminal adapted to implement the method, as will be set out in the appended claims, which are an integral part of the present description.

BRIEF DESCRIPTION OF THE DRAWINGS

Further features and advantages will become more apparent from the following detailed description of a few preferred but non-exclusive embodiments of the invention, which are provided by way of explanatory and non-limiting example with reference to the annexed drawings, wherein:

FIGS. 2 and 2bis and 2tris show three variants of a basic diagram of a multilanguage broadcast message transmission and reception system in cellular mobile communications according to the present invention;

FIGS. 3 and 3bis show two variants of a flow chart of some of the steps carried out by a mobile terminal according to the present invention;

FIGS. 4 and 4bis show two composition variants of the message sent by the service centre to the mobile users in accordance with the present invention.

In the drawings, the same reference numerals and letters identify the same items or components.

DETAILED DESCRIPTION OF A FEW EMBODIMENTS OF THE INVENTION

The following will describe in detail one example of embodiment of the invention relating to broadcast transmission of alert messages in a cellular mobile telecommunications network using the 3GPP/LTE standard. It is clear that many variant embodiments of the basic principles of the invention are still possible, depending on the particular telephone service standard employed, e.g. those mentioned above (UMTS, GPRS, GSM).

It is known that the 3GPP standard provides the possibility for a centralized service centre (CBC) to send alert messages (the above-defined ETWS/CMAS messages) to all users under cellular coverage of a certain geographic area. The transmission of alert messages occurs in broadcast mode.

Based on the provisions of the 3GPP standard, ETWS messages are divided into two types:

1) "Primary" notification messages: these messages contain primary information about the type of disaster; they may contain the following information: "Earthquake," "Tsunami," "Tsunami+Earthquake," "Test" "Other," "Reserved". A mobile telephone receiving a message of this type will have to alert the user immediately by displaying a note on the screen or by emitting sounds or vibrations, etc.

2) "Secondary" notification messages: these messages, if present, follow primary messages and contain text with further information; for example, they may include information about the earthquake epicentre, the earthquake intensity and/or emergency camps, or other information not specified by the 3GPP standard.

CMAS messages, on the other hand, are always of the above-described secondary type. ETWS/CMAS messages may be derived, for example, from indications coming from an information distribution centre connected to the CBC.

The distribution of ETWS/CMAS messages from the centralized service centre may take place with different granularity, depending on the extension of the geographic area involved:

1) At cell level: in this case, the CBC will send to another network element the list of the cells that will have to transmit ETWS/CMAS messages.
2) At Tracking Area (TA) level: in this case, the CBC will send a list of TAI's (Tracking Area Identity). Each TAI identifies one group of cells.
3) At Emergency Area (EA) level: in this case, the CBC will send a list of EAI's (Emergency Area Identity). It is up to the telephone company to specify which cells are included in each EAI.

The meaning of Cell, Tracking Area (TA) and Emergency Area is known to the man skilled in the art.

Figure 1:
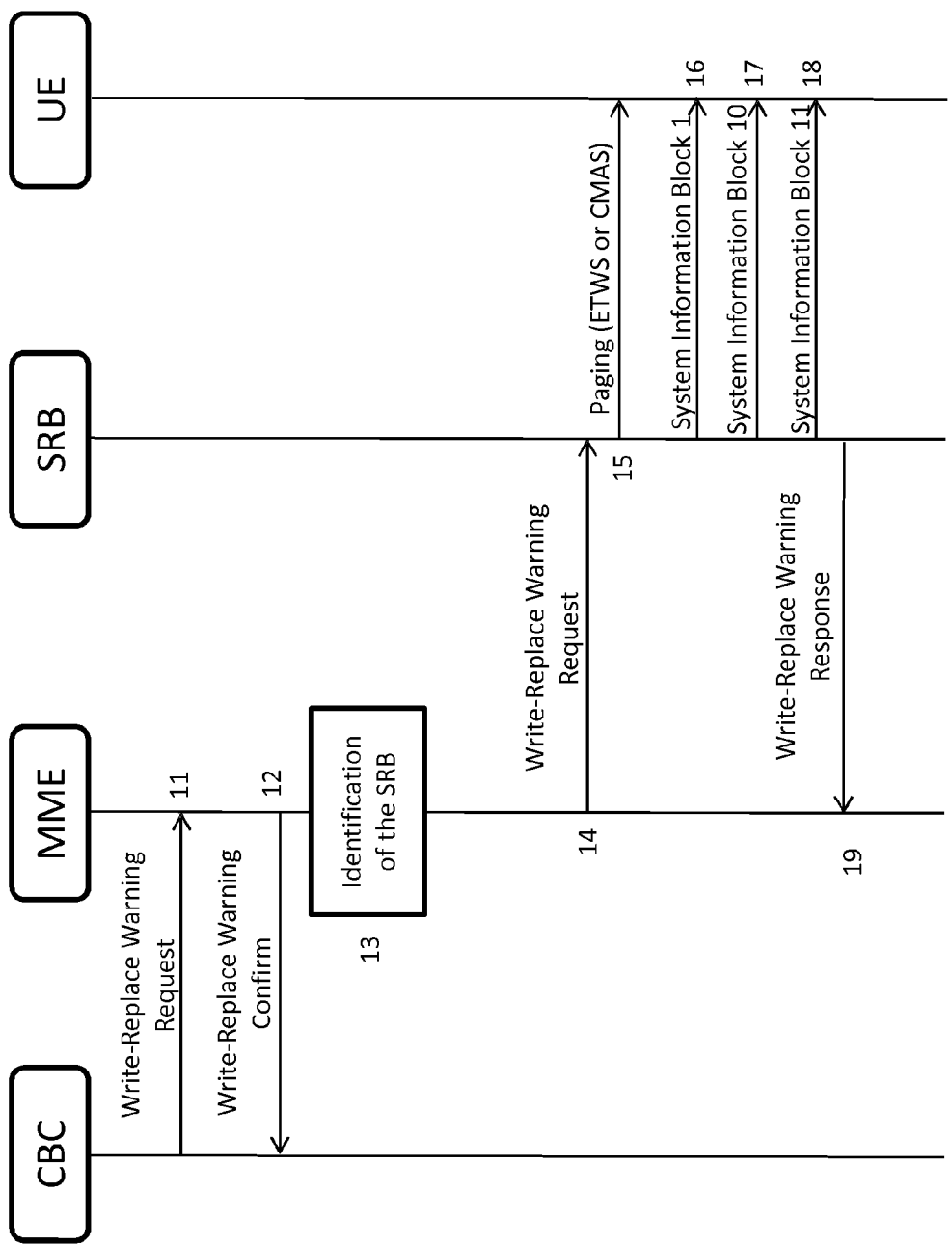
FIG. 1 is a basic diagram of a broadcast message transmission and reception system in cellular mobile communications according to the prior art.

With reference to FIG. 1, the following will describe the known procedure for distributing ETWS/CMAS messages in the presence of a system compliant with the LTE standard.

The centralized service centre CBC sends one or more messages called "Write-Replace Warning Request" (FIG. 1, step 11) to one or more network nodes MME (Mobility Management Entity) identified for message broadcasting. This message, of a known type, contains the aforementioned information relating to the contents of the ETWS/CMAS message, to the identifiers of the geographic area involved, and other signalling information pertaining to the message itself.

As will be further explained with reference to FIGS. 4 and 4bis, the "Write-Replace Warning Request" message contains numerous fields. In particular, the "Warning Message Contents" fields has a maximum size of 9,600 bytes and mainly contains the text to be sent in the SIB11 or SIB12 message (as defined below), while the field called "Data Coding Scheme", whose size is 1 byte, contains information about the text language. In the event that the text of the message to be sent to the SRB's cannot be contained in 9,600 bytes, then multiple "Write-Replace Warning Request" messages may be sent in sequence.

It must be pointed out that, as will be further explained below, there is similarity to the procedure according to the UMTS standard, wherein an identical or similar message is sent to an entity called RNC (Radio Network Controller).

Those network nodes (MME or RNC) which receive this type of message reply to the CBC with a reception confirmation message called "Write-Replace Warning Confirm" (FIG. 1, step 12). Then they decode the cell identity list (or the TAI or EAI list) (FIG. 1, step 13) to which the message is to be sent, and the contents of the alert message: in this manner, they obtain both the list of the cells that must transmit the ETWS/CMAS messages and the contents of the primary and secondary notifications (secondary notifications only for CMAS).

Subsequently, the MME (or RNC) element sends to the radio base stations RBS of the cells involved one or more "Write-Replace Warning Request" messages with the primary and secondary contents of the ETWS/CMAS messages (FIG. 1, step 14). The radio base stations SRB, as they receive the notification, immediately transmit a Paging message (FIG. 1, step 15) to all user terminals UE (User Equipment) managed by the radio base station to which they are referring. Said Paging message is of a known type and contains the indication, called ETWS-Indication or CMAS-Indication, of the presence of an ETWS or CMAS message, respectively, in the broadcast channel.

When it receives the Paging message, the mobile telephone UE understands (by decoding the ETWS or CMAS indication) that the broadcast channel may contain an ETWS or CMAS message, and therefore it readily decodes the broadcast channel in order to receive the primary indications and possibly also the secondary indications of the ETWS or CMAS messages. The ETWS information is included in two blocks of the broadcast channel, respectively called System Information Block 10 or SIB10 (for ETWS primary notification) and System Information Block 11 or SIB11 (for ETWS secondary notification). The CMAS information is included in the System Information Block 12 or SIB12 (CMAS secondary notification only) (FIG. 1, steps 16, 17, 18).

The radio base stations SRB then reply to the MME with a transmission confirmation message called "Write-Replace Warning Response" (FIG. 1, step 19).

The structures of the "ETWS", "CMAS", "Write-Replace Warning Request", "Write-Replace Warning Confirm", "Write-Replace Warning Response", "Paging", "System Information Block" messages are per se known to those skilled in the art and are described, for example, in the documents relating to the 3GPP standard. The above-described known procedure only uses one language, preset by the telephone company, for the text of ETWS/CMAS messages. This involves the risk that the message text, especially the one included in the secondary notification, might not be understood by all users.

One example of a solution to this problem, in accordance with the present invention, is provided by the following procedure.

Figure 2:
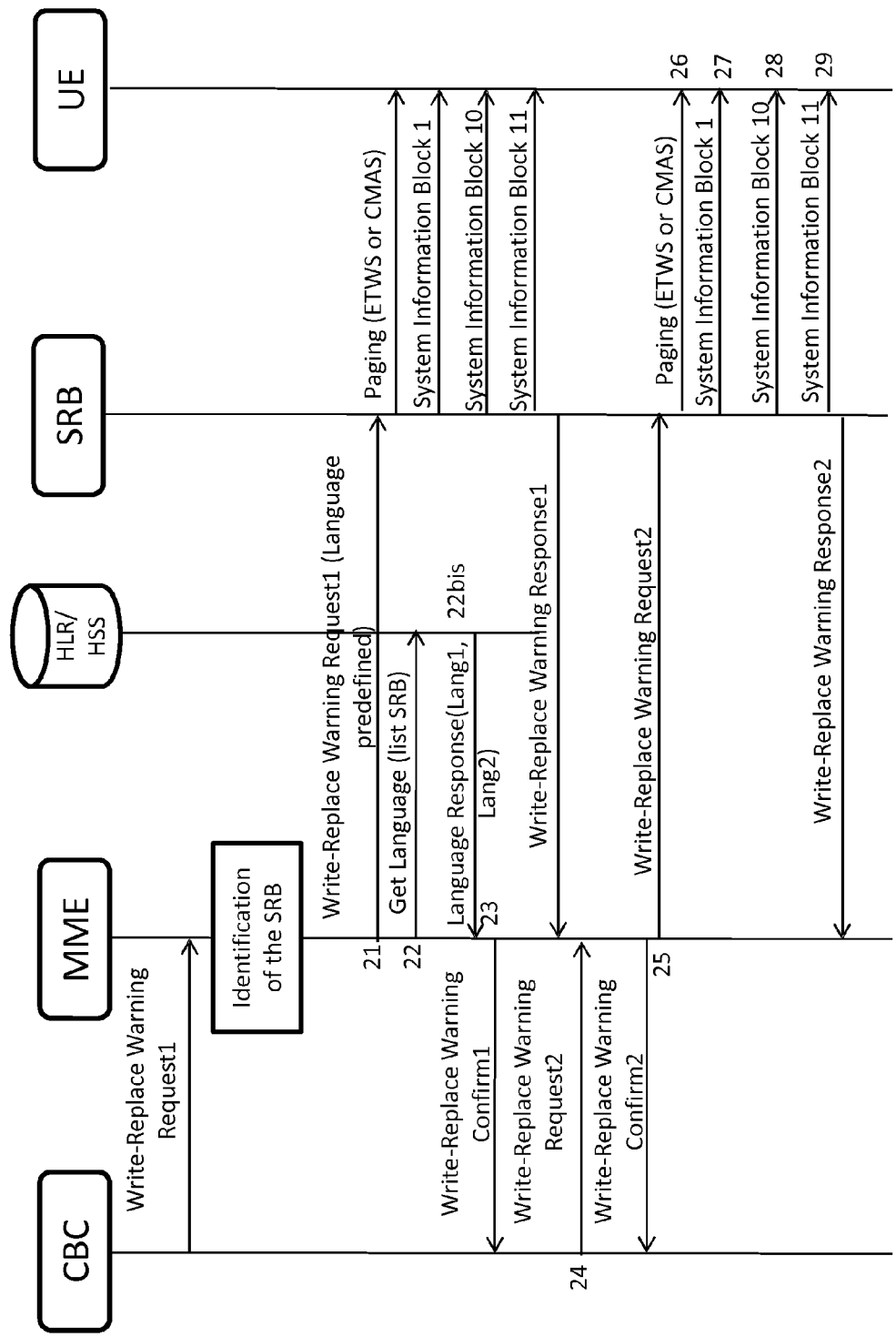

With reference to FIG. 2, as the MME element (or the RNC element in the UMTS standard) receives from the CBC the "Write-Replace Warning Request1" message in accordance with the known procedure described above, it stores the list of the radio base stations SRB to be notified, to which it sends a corresponding "Write-Replace Warning Request1 (language predefined)" message. Through this message, it indicates that the ETWS primary message, and possibly also the ETWS or CMAS secondary message, must be notified in a predefined language (FIG. 2, step 21) to all user terminals UE managed by the radio base stations SRB of the cells they are referring to.

As in the known procedure described above, the radio base stations SRB, after receiving the notification, immediately transmit a "Paging (ETWS or CMAS)" message to all user terminals UE managed by the radio base station they are referring to. Said Paging message contains the indication of the presence of an ETWS or CMAS message in the broadcast channel.

As aforementioned, when it receives the Paging message, the mobile telephone UE of each user decodes the broadcast channel in order to receive the ETWS or CMAS messages. The ETWS and CMAS information is included in the broadcast channel blocks System Information Block 10, System Information Block 11 and System Information Block 12.

The radio base stations SRB then reply to the MME with a transmission confirmation message called "Write-Replace Warning Response".

In the meantime, the MME (or RNC) element interrogates the HLR/HSS database (FIG. 2, step 22) or the like, which contains the identifiers of those users who are available and referring to the previously identified cells. The HLR/HSS database may be located at the MME element itself or at the centralized service centre CBC, and contains all information necessary to create matches between user identifiers and preferred languages.

In a first possible variant, through the known "Get Language (list SRB)" message, the MME (or RNC) element supplies to the HLR/HSS database the list of SRB cells to which alerts should be notified, and obtains from the database, through the "Language Response (Lang1, Lang2)" message, a list of languages to be used (FIG. 2, step 22bis). The latter, for example, are directly obtained from the first IMSI digits and are communicated by using a different format (e.g. a format similar to the one used for the $EF_{PL}$ parameter stored in the SIM, of a per se known type, indicating the language preferred by the user) or by using the format of the "data coding scheme" field, of a per se known type, as used in the "Write-Replace Warning Request" message.

Alternatively, the MME (or RNC) element interrogates the HLR/HSS database (FIG. 2bis, step 22') through the "Get IMSI (list SRB)" message, supplying to the database the list of the cells to which alerts should be notified as in the above case, but obtaining from the latter the list of IMSI identifiers of the users to be notified (FIG. 2bis, step 22bis'), through the "IMSI List Response" message. IMSI identifiers are located and stored in the HLR/HSS database or the like. In this second case, the MME (or RNC) itself obtains the preferred language from fields included in each IMSI, and then supplies to the CBC a univocal list of languages to be used. The HLR/HSS database may be of a known type, as aforementioned, and may be managed by the network operator.

For each user, language and nationality may be obtained, for example, from the first 6 digits of the IMSI identifier, which represent the Mobile Country Code (MCC) and the Mobile Network Code (MNC) (the meaning and structure of these fields being known).

A further variant (FIG. 2tris) may be conceived to include the case wherein one or more users may choose as their normal language, on their own mobile telephone, a language other than the official ones of the company to which they have subscribed, and that particular language does not appear in the list of the already selected languages, as described above. As a matter of fact, quite commonly users temporarily abroad use SIM's of local companies to take advantage of lower rates; very often such users do not speak the chosen company's official language, and therefore, after having inserted the SIM into the phone, they choose a language option which is different from the company's official language. In such a case, it is not appropriate to associate the language of each user with the code obtained from the IMSI, because this would give rise to the risk of sending messages to users who would then interpret them incorrectly. Moreover, some individuals may belong to a linguistic minority of their own country of origin or residence, so that their preferred language may be different from the one which is commonly associated with the country they belong to (e.g. a German-speaking person from Upper Adige, residing in Italy and using an Italian company). It must be pointed out that, with this system, messages are automatically displayed in the preferred language based on the language selected on the user's telephone, without the user having to expressly specify in which language he/she wants to receive ETWS/CMAS messages.

In this case, it is conceivable that the MME, e.g. after having received the "Write-Replace Warning Response 1" message, sends to the selected radio base stations SRB an "Identity Request" message of a per se substantially known type (FIG. 2tris, step 30) for each user, which message is then sent to all mobile telephones UE referring to such SRB's (FIG. 2tris, step 31); the "Identity Request" message also contains new data, through which the UE is requested to send information about the actually chosen language. A mobile terminal equipped with a SIM has generally access to a memory area containing information about the user's preferred language. This memory area is referred to in the 3GPP standards as $EF_{LP}$ or $EF_{PL}$. In general, the chosen language is set by the user and stored into the $EF_{PL}$ field. If this field is not present in the SIM or contains a language code which is not compatible with the terminal, then the terminal will gain access to the list of preferred languages contained in the $EF_{LP}$ field, which is generally defined by the telephone company. Said field contains 1-byte or 2-byte codes that identify the languages according to a priority order.

In order to allow a user to set a preferred language, a terminal may also, in addition to accessing the languages contained in the $EF_{LP}$ or $EF_{PL}$ fields, access a list of factory preset languages stored in any memory area of the telephone. Once the user has selected his/her preferred language, this is stored into the $EF_{PL}$ field in the SIM and also into a memory area of the telephone. The user's preferred language may be changed several times over time, and such changes will be stored into both that memory area of the telephone and the $EF_{PL}$ field.

As a consequence, each mobile terminal UE sends to the SRB to which it is connected an "Identity Response (language)" message (FIG. 2tris, step 32) that includes said information, i.e. the user's preferred language; also the "Identity Response (language)" message is of a substantially known type, but contains new data relating to said user language, which is obtained by the terminal through access to the SIM's memory area that contains the $EF_{PL}$ or $EF_{LP}$ fields, said fields containing the language actually used and chosen by the user. In its turn, each SRB sends to the MME a corresponding "Identity Response (language)" message (FIG. 2tris, step 33) that includes the list of said languages, which will thus be added to those already determined in the previous steps, if different from the latter.

The structure of the "Identity Request" messages is already known for the purpose of requesting information such as the IMSI field. The structure of the "Identity Response" messages is already known for the purpose of including information such as the IMSI field; this information may be replaced or complemented with a field containing the code of the language actually in use.

In all of the above-described cases, the MME (or RNC) transmits the list of all obtained languages to the CBC, for example through the "Write-Replace Warning Confirm1" message (FIG. 2, 2bis, 2tris, step 23).

In all of the above-described cases, the CBC returns to the MME the text of the broadcast messages in the different languages previously identified and received by the MME (or RNC) (FIGS. 2, 2bis, 2tris, step 24) through the "Write-Replace Warning Request2" message.

As aforesaid, the MME replies to the CBC by sending the reception confirmation message called "Write-Replace Warning Confirm2".

With reference to FIGS. 4 and 4bis, the "Write-Replace Warning Request2" message may, according to a possible variant, contain the message in different languages in the "Warning Message Contents1" field (43, FIG. 4). In this case, it must be ensured that, at the beginning of each message in a given language, there is a field identifying the message start in a given language ("Warning Message Start" 41 in FIG. 4), followed by a field of the "Data Coding Scheme" type (42, FIG. 4), which identifies the particular language used in the message (2 in FIG. 4), or vice versa, i.e. the "Data Coding Scheme" field may precede the field that identifies the message start in a given language.

Alternatively, a field may be included at the beginning of the message in a given language to provide both the message start information and the language information (41', FIG. 4bis), followed by the "Warning Message Contents1" field (43, FIG. 4bis).

In a further variant, in order to send the messages in different languages, the CBC or the MME or the RNC may send as many "Write-Replace Warning Request2" messages as the number of univocally identified languages. In this case, the structure of the single "Write-Replace Warning Request2" messages will be identical to those defined by the 3GPP standard.

The CBC is equipped with means for storing messages in the various languages that may potentially be used by the users.

Therefore, the MME (or RNC) element sends the "Write-Replace Warning Request2" message(s) to the SRB cells involved, including therein the ETWS or CMAS secondary notification in the different languages chosen (FIGS. 2, 2bis, 2tris, step 25).

The radio base station repeats the above-described procedure for sending the "Paging (ETWS or CMAS)" message to the terminals UE by including or updating the text of the secondary notification with the text in the different languages previously received from the MME (or the RNC) (FIGS. 2, 2bis, 2tris, steps 26, 27, 28, 29).

Figure 3:
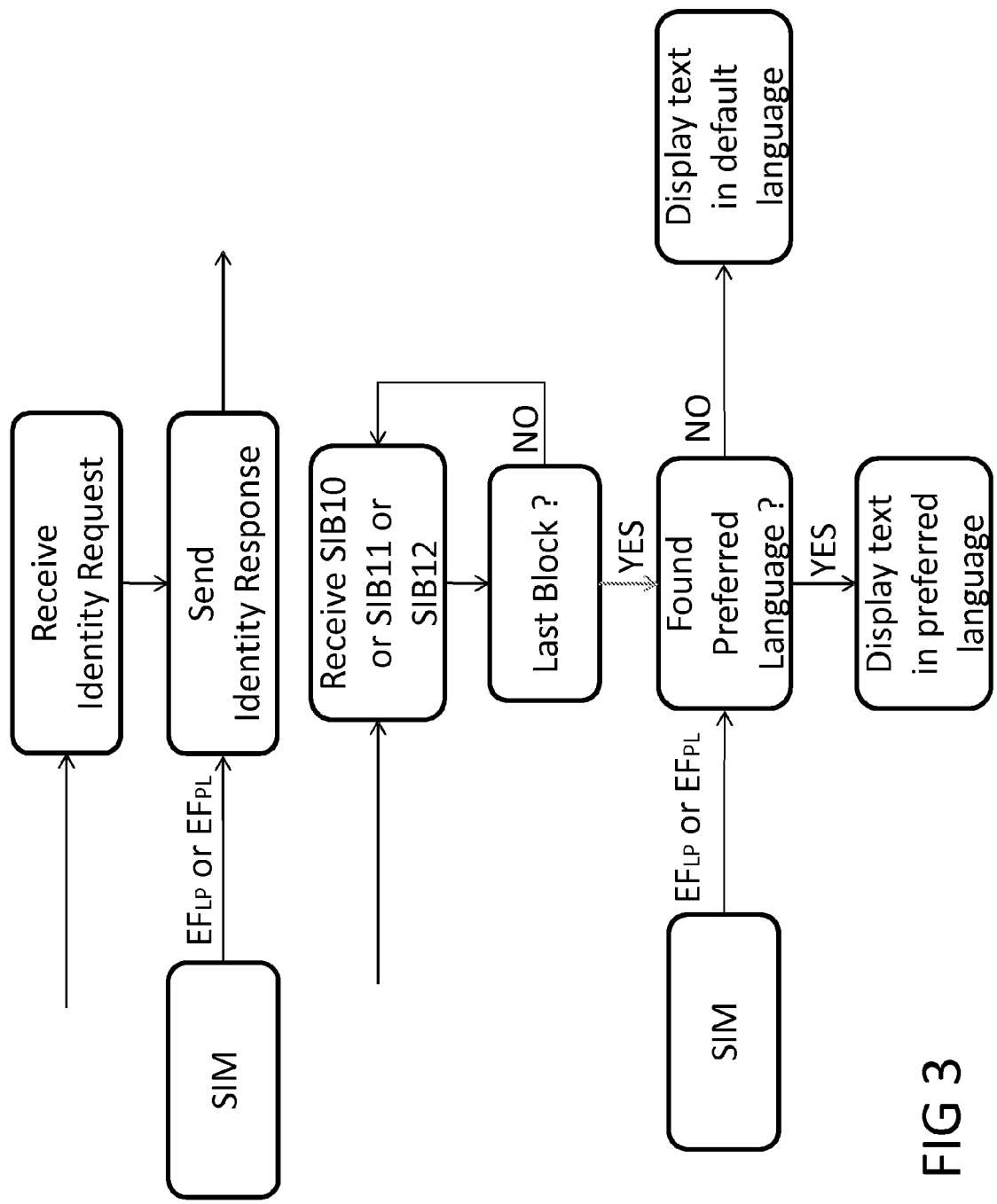

One example of how the contents of the broadcast channel blocks are decoded by the mobile telephone UE is shown in FIG. 3.

According to a variant of the invention, the mobile telephone UE receives from the network the "Identity Request" message (FIGS. 3 and 3bis, "Receive Identity Request") containing the request to send the information about the actually chosen user language. The mobile telephone UE reads in the SIM the $EF_{LP}$ or $EF_{PL}$ field containing said information, and replies to the network with an "Identity Response (language)" message (FIGS. 3 and 3bis, "Send Identity Response") containing the code of the chosen language. The mobile telephone UE may also read the preferred language information from an apparatus in communication with the SIM (mobile telephone, tablet or the like).

Each mobile telephone UE receives the Paging message with the notification indicating the presence of an ETWS or CMAS message, and then prepares itself to decode the contents of the broadcast channel blocks System Information Block 10, System Information Block 11 and System Information Block 12, in a manner which is per se known to those skilled in the art (FIG. 3, "Receive SIB10 or SIB11 or SIB12"). The mobile telephone will end the decoding of the blocks (SIB11 or SIB12) after receiving the last segment of the message (FIG. 3, "Last Block?").

In accordance with one aspect of the invention, at this point the mobile telephone will identify the message segments in its preferred language. The process of identifying the message part in the preferred language may take place as follows:

1) extracting and decoding the "Data Coding Scheme" field contained in the SIB11 or SIB12 message: said field (e.g. of 8 bits), as aforesaid, describes the language used in the message included in SIB11 or SIB12;
2) comparing the code contained in the "Data Coding Scheme" with the code (e.g. the code contained in the $EF_{LP}$ or $EF_{PL}$ field) of the preferred language obtained from the SIM or from an apparatus in communication with the SIM (mobile telephone, tablet or the like) (FIGS. 3 and 3bis, "Found preferred language?").

In another variant of the invention (FIG. 3bis), the message may also be displayed or notified to the user in the preferred language before the telephone receives the last segment of the message. In this case, it is sufficient that the telephone, after having successfully compared the code contained in the "Data Coding Scheme" with the code of the preferred language (FIG. 3bis, "Data coding scheme changes?") starts displaying the message text until it decodes a subsequent change in the "Data Coding Scheme", at which point the telephone will consider the message to be notified to the user as complete.

Preferably, the telephone UE displays the text of the message of SIB11 or SIB12 in the preferred language, if present, otherwise it will display the text in a predefined language, e.g. the first language received, or in a language chosen among the most commonly spoken ones (English, French, Spanish, etc.).

The above-described example of embodiment of the invention should not be intended as a limiting one, since other variants are still possible without departing from the protection scope of the present invention, including all equivalent embodiments conceivable by those skilled in the art.

For example, the meaning of the messages may be extended to one or two ETWS/CMAS levels as described above, to any type of message contents and message organization, not only with regard to alert conditions, but also to other types of information to be broadcast to mobile terminals connected to mobile networks within specific geographic areas.

The MME (or RNC) element may directly include the message text in different languages, without having to wait for such information from the CBC. Therefore, if the MME already knows the list of the languages to be used, it may handle the process of communicating with the downstream elements SRB and UE in such a way as to avoid the first part (steps 21 to 23) of the procedure described with reference to FIG. 2, and to issue right away the "Write-Replace Warning Request2" message(s) of step 25, which will already contain the messages in all the selected languages.

In some cases, it may be possible to integrate the function of the service centre CBC into the network element itself, depending on the type of broadcast service to be provided. Alternatively, the CBC may directly interrogate the HLR/HSS database in order to obtain the various languages to be used in the ETWS/CMAS messages, and then issue "Write-Replace Warning Request1" message(s) already containing the messages in all of the selected languages. In this case as well, the MME (or RNC) will directly issue the "Write-Replace Warning Request2" message(s) of step 5, already containing the messages in all of the selected languages.

A mobile telecommunications network adapted to implement the invention comprises:

a service centre (CBC), the structure of which may be either centralized at a network node or distributed over multiple nodes of a substantially known type, which structure manages the formation and emission of messages in broadcast mode;

one or more network nodes (MME or RNC), which perform different functions depending on the type of network: for example, they may be network controllers (RNC=Radio Network Controller) in a 3GPP architecture, or Mobility Management Entities (MME) in an LTE architecture, or other types of nodes; these nodes provide a bidirectional connection with the service centre in a per se known manner, and carry out the function of concentrating and/or distributing the broadcast messages received from the service centre;

a database containing the list of the languages that can be used for the messages, adapted to be accessed by the service centre (CBC) and/or by the network nodes (MME or RNC); the database is built with information derived from the terminals connected to the network, which information is adapted to identify the languages used by the terminals themselves.—means for transforming a single-language message into a multilanguage message based on said language list, said means being adapted to be placed either at the level of the service centre (CBC) or at the level of the network nodes (MME or RNC);

one or more radio base stations (SRB) configured to establish a bidirectional connection to the respective node (MME or RNC), from which they receive multilanguage messages in broadcast mode to be sent to all the mobile terminals referring thereto.

A mobile terminal adapted to implement the invention essentially comprises means, possibly provided through software that may also be installed after purchasing the terminal, for:

supplying to the network the information required to identify the language chosen by the user, or the reference language of the telephone company;

interpreting the language codes of the received messages in order to choose the ones in the correct language;

displaying the selected messages.

The above-described procedures of the present invention can advantageously be carried out through software programs, which comprise coding means for implementing one or more steps of the programs themselves, when such programs are executed on suitable hardware, at both telecommunications network level and mobile terminal level. It is therefore understood that the protection scope extends to said program as well as to hardware-readable means that comprise recorded messages, said readable means comprising program coding means for implementing one or more steps of the method according to the invention when said programs are executed on suitable hardware.

The advantages deriving from the application of the present invention are apparent. Messages, especially ETWS/CMAS alert messages, but also other critical messages, must be such that they can be understood clearly, unmistakably and quickly. For this reason, the method of the present invention, which provides for sending messages in the language preferred by each connected user, is clearly preferable over a solution in which the message is broadcast in a language defined a priori, which might not be understood by all users.

The solution described herein uses network elements, information and protocols already available in UMTS networks and in latest-generation networks such as LTE. It only requires the MME (or RNC) to interrogate once more the database in order to retrieve information about the language preferred by the users in the cells involved, and to send an additional notification message to the CBC. Nevertheless, these elements (MME or RNC and Database) are usually connected to and communicate with each other according to protocols defined by the standard.

From the above description, those skilled in the art will be able to produce the object of the invention without introducing any further construction details.

The invention claimed is:

1. A method for broadcasting messages in a cellular mobile communications system with broadcast functionality, the method comprising the steps of:
   selecting a geographic area over which said message broadcasting must be carried out;
   obtaining information adapted to identify a set of languages used in mobile terminals referring to the cellular mobile communications system within said geographic area;
   composing said messages in the set of said identified languages, thus obtaining one or more multilanguage messages, the one or more multilanguage messages included in blocks of a broadcast channel in a set of languages preferred by users of a plurality of said mobile terminals;
   broadcasting said one or more multilanguage messages to said mobile terminals,
   wherein said step of obtaining information adapted to identify the languages used in mobile terminals referring to the cellular mobile communications system within said geographic area comprises:
      sending to said mobile terminals at least one request message requesting at least one identifier of the language used in said mobile terminals;
      acquiring at least one identifier of a user's preferred language chosen by the user and stored in a memory area of said mobile terminals, wherein said request message contains a request to provide to said cellular mobile communications system identification parameters comprising an IMSI (International Mobile Subscriber Identity), or an IMEI (International Mobile Equipment Identity);
      transmitting said at least one identifier of the user's preferred language from said mobile terminals to said mobile communications network;
      storing said at least one identifier of the user's preferred language in a facility of said mobile communications network,
   wherein said step of composing said messages in the set of said identified languages, thus obtaining one or more multilanguage messages, comprises:
      providing a list of translations of said messages into a set of different languages, each language having its own identifier;
      comparing said at least one identifier of different languages with said at least one identifier identifying the country of and/or the language used in said mobile terminals;
      composing said one or more multilanguage messages, comprising a sequence of messages in each of said languages identified on the basis of a correspondence between said at least one language identifier and said at least one identifier, each of said messages in the sequence comprising at least one piece of information relating to said at least one language identifier.

2. The method for broadcasting messages according to claim 1, wherein said step of selecting a geographic area over which said message broadcasting must be carried out comprises the selection of cells of the cellular mobile communications system in which said messages must be broadcast.

3. The method for broadcasting messages according to claim 1, wherein said sequence of messages in each of said languages is entered into one multilanguage message or is distributed over a number of multilanguage messages.

4. A non-transitory computer-readable storage medium comprising a recorded program, said non-transitory computer-readable storage medium comprising program coding means adapted to implement the steps of claim 1 when said program is executed on a computer.

5. A cellular mobile telecommunications network with broadcast functionality, comprising:
   a service center configured to manage a formation and emission of multilanguage messages in broadcast mode to mobile terminals;
   one or more network nodes configured to provide a bidirectional connection with said service center and to distribute said multilanguage messages in broadcast mode received from the service center;
   a database configured to store at least one identifier of a user's preferred language chosen by the user of said mobile terminals and stored in a hardware memory area of the terminals, wherein the identifier has been acquired from said mobile terminals upon specific request to receive it by said cellular mobile telecommunications network, and wherein the identifier individuates the language used in said terminals, and configured to be accessed by the service center and/or by the network nodes;
   wherein said service center is configured to:
      provide translations of said messages into a set of different languages, each language having at least one identifier of its own;
      compare said at least one language identifier with said at least said one identifier of the user's preferred language identifying the language used in said mobile terminals;
      compose said multilanguage messages in said set of languages identified on the basis of the match found through said comparison; and
   one or more radio base stations configured to establish a bidirectional connection to the respective network node and to receive said multilanguage messages in broadcast mode to be sent to all the mobile terminals referring to said stations.

6. The mobile telecommunications network according to claim 5, adapted to manage broadcast-type mobile communications in accordance with any one of the 3GPP (3$^{rd}$ Generation Partnership Project), LTE (Long Term Evolution), UMTS (Universal Mobile Telecommunications System), GPRS (General Packet Radio Service), GSM (Global System for Mobile Communications) standards, wherein said multilanguage messages are structured according to the System Information Block 10 and/or System Information Block 11 and/or System Information Block 12 types.

7. The cellular mobile telecommunications network as in claim 5, wherein said hardware memory area of the mobile terminal comprises a Subscription Identity Module of the mobile terminal or any other hardware memory area of the mobile terminal.

8. A mobile terminal configured to receive a broadcast message and adapted to operate in a cellular mobile telecommunications system with broadcast functionality, the mobile terminal comprising a hardware memory and a hardware processor, the hardware processor configured to:
   receive one or more multilanguage broadcast messages from the cellular mobile telecommunications system, said one or more multilanguage broadcast messages being included in blocks of a broadcast channel in a set of languages preferred by users of a plurality of said mobile terminals;
   interpret a piece of information relating to at least one language identifier in each of said one or more multilanguage broadcast messages;
   compare said at least one language identifier of each message with at least one identifier of a user's preferred language chosen by a user of the mobile terminal and stored in the hardware memory of the mobile terminal identifying the language used in the mobile terminal;
   select the message for which a match is found through said comparison; and
   display the selected message;
   wherein the mobile terminal is adapted to manage broadcast-type mobile communications in accordance with any one of the 3GPP ($3^{rd}$ Generation Partnership Project), or LTE (Long Term Evolution), UMTS (Universal Mobile Telecommunications System), GPRS (General Packet Radio Service), GSM (Global System for Mobile Communications) standards, wherein said multilanguage messages are structured according to the System Information Block 10 and/or System Information Block 11 and/or System Information Block 12 types.

9. The mobile terminal according to claim 8, the hardware processor further configured to:
   receive at least one request to send said at least one identifier;
   send said at least one identifier to a service center.

10. The mobile terminal according to claim 8, wherein said hardware memory area of the mobile terminal comprises a Subscription Identity Module of the mobile terminal or any other hardware memory area of the mobile terminal.

* * * * *